United States Patent
Damm et al.

(10) Patent No.: US 9,797,458 B2
(45) Date of Patent: Oct. 24, 2017

(54) SHIFTING DEVICE FOR A MOTOR VEHICLE TRANSMISSION

(71) Applicant: Hoerbiger Antriebstechnik Holding GmbH, Schongau (DE)

(72) Inventors: Ansgar Damm, Kinsau (DE); Peter Echtler, Schongau (DE); Michael Koelzer, Rosshaupten (DE); Juergen Ackermann, Waal (DE); Kjell Lundin, Zwingenberg (DE)

(73) Assignee: HOERBIGER ANTRIEBSTECHNIK HOLDING GMBH (DE)

( * ) Notice: Subject to any disclaimer, the term of this patent is extended or adjusted under 35 U.S.C. 154(b) by 0 days.

(21) Appl. No.: 15/210,705

(22) Filed: Jul. 14, 2016

(65) Prior Publication Data
US 2017/0016486 A1    Jan. 19, 2017

(30) Foreign Application Priority Data

Jul. 14, 2015 (DE) ..................... 10 2015 111 356

(51) Int. Cl.
*F16D 13/22* (2006.01)
*F16D 13/52* (2006.01)
(Continued)

(52) U.S. Cl.
CPC ............ *F16D 13/32* (2013.01); *F16D 13/52* (2013.01); *F16D 13/683* (2013.01); *F16D 13/72* (2013.01);
(Continued)

(58) Field of Classification Search
CPC ........ F16D 13/32; F16D 13/683; F16D 13/72; F16D 23/025; F16D 23/06;
(Continued)

(56) References Cited

U.S. PATENT DOCUMENTS

| 5,308,295 | A | * | 5/1994 | Michioka | ................. F16H 3/66 475/275 |
| 7,108,115 | B2 | * | 9/2006 | Ebenhoch | .............. F16D 23/06 192/53.1 |

(Continued)

FOREIGN PATENT DOCUMENTS

| DE | 10244523 | 4/2004 | ............ F16D 23/02 |
| DE | 10331370 | 3/2005 | ............ F16D 25/10 |

(Continued)

OTHER PUBLICATIONS

German Office Action issued in application No. 10 2015 111 356.2, dated May 3, 2016 (10 pgs).

*Primary Examiner* — Terry Chau
(74) *Attorney, Agent, or Firm* — Hayes Soloway P.C.

(57) ABSTRACT

A shifting device for a motor vehicle transmission includes several transmission shafts which each are rotatable about a transmission axis, a synchronizer ring which is firmly connected with a transmission shaft, a first disk carrier, a plurality of first disks which are non-rotatably and axially shiftably connected with the first disk carrier, a second disk carrier which is axially shiftable relative to the first disk carrier and in circumferential direction can be coupled with the synchronizer ring both frictionally and positively, a plurality of second disks which are non-rotatably and axially shiftably connected with the second disk carrier and form a multidisk clutch with the first disks, and an actuating body for axially pressurizing the second disk carrier, wherein the actuating body and the second disk carrier are rotatable relative to each other in circumferential direction and substantially are firmly connected with each other in axial direction.

15 Claims, 7 Drawing Sheets

(51) Int. Cl.
*F16D 23/06* (2006.01)
*F16D 25/0632* (2006.01)
*F16D 25/0638* (2006.01)
*F16D 13/32* (2006.01)
*F16D 13/72* (2006.01)
*F16D 23/02* (2006.01)
*F16D 13/68* (2006.01)

(52) U.S. Cl.
CPC ........... *F16D 23/025* (2013.01); *F16D 23/06* (2013.01); *F16D 25/0632* (2013.01); *F16D 25/0638* (2013.01); *F16D 2023/0643* (2013.01); *F16D 2023/0693* (2013.01)

(58) Field of Classification Search
CPC ............. F16D 25/0632; F16D 25/0638; F16D 2023/0693; F16D 13/52; F16D 2023/0643; F16H 1/00
See application file for complete search history.

(56) References Cited

U.S. PATENT DOCUMENTS

| | | | | |
|---|---|---|---|---|
| 7,281,618 | B2 | 10/2007 | Ebenhoch et al. | 192/53.1 |
| 7,357,235 | B2 | 4/2008 | Schmidt et al. | 192/53.1 |
| 9,322,439 | B2 | 4/2016 | Appeltauer et al. | F16D 21/00 |
| 2012/0247913 | A1* | 10/2012 | Nakano | F16D 23/06 |
| | | | | 192/18 A |
| 2013/0267373 | A1* | 10/2013 | Mellet | F16H 3/62 |
| | | | | 475/278 |
| 2014/0151178 | A1* | 6/2014 | Appeltauer | F16D 21/08 |
| | | | | 192/48.5 |

FOREIGN PATENT DOCUMENTS

| | | | | |
|---|---|---|---|---|
| DE | 102004031245 | | 1/2006 | ............ F16D 23/04 |
| DE | 102011107245 | | 3/2012 | ............ F16D 23/04 |

* cited by examiner

SHIFTING DEVICE FOR A MOTOR VEHICLE TRANSMISSION

FIELD OF THE INVENTION

This invention relates to a shifting device for a motor vehicle transmission, in particular a fully automatic stepped transmission, comprising several transmission shafts which each are rotatable about a transmission axis, a synchronizer ring which is firmly connected with a transmission shaft, a first disk carrier, a plurality of first disks which are non-rotatably and axially shiftably connected with the first disk carrier, a second disk carrier which is axially shiftable relative to the first disk carrier and in circumferential direction can be coupled with the synchronizer ring both frictionally and positively, a plurality of second disks which are non-rotatably and axially shiftably connected with the second disk carrier and form a multidisk clutch with the first disks, and an actuating body for axially pressurizing the second disk carrier.

BACKGROUND

In automotive engineering, automatic transmissions, in particular stepped fully automatic transmissions with hydrodynamic torque converter and planetary transmissions are used for power transmission beside manual variable-speed transmissions.

Such fully automatic stepped transmissions act as powershift transmissions without interruption of the tractive force, wherein the power flow is effected via planetary gearsets and the gear changes occur by coupling or releasing individual planetary gearset elements. The coupling of individual planetary gearset elements presently is effected by means of multidisk clutches which must be designed for a maximum torque to be transmitted and comprise a corresponding number of friction points and disks for torque transmission. Due to the numerous friction points, the undesired drag torques are quite high in the decoupled condition and have a disadvantageous effect on the transmission efficiency.

For this reason, the generic DE 102 44 523 A1 already has proposed a vehicle transmission in which the Internal disk carrier is coupled with a rotatable transmission component, e.g. a transmission shaft, via a synchronizer. The synchronizer selectively provides for a decoupling, a frictional coupling or a positive coupling of the internal disk carrier with the transmission shaft. In the decoupled condition of the synchronizer drag torques likewise occur, which due to the considerably smaller friction surfaces as compared to the multidisk clutch however are distinctly smaller. In the decoupled condition of the shifting device, i.e. with open multidisk clutch and decoupled synchronizer, the lower drag torques result in a relative rotation exclusively or at least for the most part in the region of the synchronizer and hardly or no longer at all in the region of the multidisk clutch, so that the transmission efficiency is increased.

However, the construction of the vehicle transmission as disclosed in DE 102 44 523 A1 is relatively complex and in addition has an undesirably high shifting force level. According to FIG. 7, the high shifting force level results from the fact that the actuating body is urged into a decoupled starting position of the shifting device by a first spring means and a third spring means. To ensure the desired functionality of the shifting device, the third spring means must be designed softer than the first spring means. However, the third spring means also must be hard enough to ensure a safe design of the positive connection between the toothing profiles. These requirements of the spring means in total lead to an undesirably high shifting force level of the shifting device proposed in the prior art.

It is the object of the invention to create a constructively simple shifting device for a motor vehicle transmission, which due to low drag torques contributes to a high transmission efficiency and in addition has a low shifting force level.

SUMMARY

The present invention provides a shifting device for a motor vehicle transmission, in particular a fully automatic stepped transmission, comprising several transmission shafts which each are rotatable about a transmission axis, a synchronizer ring which is firmly connected with a transmission shaft, a first disk carrier, a plurality of first disks which are non-rotatably and axially shiftably connected with the first disk carrier, a second disk carrier which is axially shiftable relative to the first disk carrier and in circumferential direction can be coupled with the synchronizer ring both frictionally and positively, a plurality of second disks which are non-rotatably and axially shiftably connected with the second disk carrier and form a multidisk clutch with the first disks, and an actuating body for axially pressurizing the second disk carrier. The actuating body and the second disk carrier are rotatable relative to each other in circumferential direction and are substantially firmly connected with each other in axial direction. This means in particular that the second disk carrier is rigidly attached to the actuating body in both opposite axial directions, so that no axial relative movement is possible. Minimum relative movements by unavoidable axial clearance in the connecting region as well as elastic and/or plastic material deformation of the actuating body, the second disk carrier or interposed connecting components such as a bearing ring are negligible.

The invention is based on the finding that the actuating body can firmly be connected with the second disk carrier without functional impairment of the shifting device in axial direction. The axially shiftable support of the internal disk carrier on the actuating body formed as hydraulic piston unit, which is present in DE 102 44 523 A1, therefore is not necessary. Correspondingly, the first spring means according to FIG. 7 of DE 102 44 523 A1 also can be omitted, whereby the shifting force level is reduced in an advantageous way and the construction of the shifting device is simplified.

According to one embodiment of the shifting device, the first disk carrier forms a transmission housing or is firmly connected with a transmission housing. The shifting device in this case acts as brake which is able to slow down the rotatable transmission shaft and to non-rotatably arrest the same at the housing. In the narrower sense, the multidisk clutch then forms a multidisk brake.

According to an alternative embodiment of the shifting device the first disk carrier is substantially non-rotatably connected with a further transmission shaft or even formed integrally with the same. The two separate transmission shafts in particular are coaxially arranged transmission shafts of different planetary gearsets which can experience a speed adaptation by the shifting device.

There is preferably provided a form-fit ring which is firmly connected with the second disk carrier and includes form-fit elements for the positive coupling with the synchronizer ring.

In this case, the synchronizer ring can include form-fit elements which can be brought in engagement with the form-fit elements of the form-fit ring by axial relative displacement, in order to couple the synchronizer ring and the form-fit ring in circumferential direction.

In addition, there is preferably provided a friction ring which is axially shiftably and in circumferential direction positively connected with the second disk carrier and includes a cone surface for the frictional coupling with the synchronizer ring.

In this case, the synchronizer ring can have a cone surface which can be brought in contact with the cone surface of the friction ring by axial relative displacement, in order to couple the synchronizer ring and the friction ring in circumferential direction.

According to a design variant of the shifting device, the friction ring and the second disk carrier are rotatable relative to each other in circumferential direction to a limited extent and include blocking surfaces associated to each other, which enable or block an axial relative displacement between the friction ring and the second disk carrier depending on a synchronizing torque between the friction ring and the synchronizer ring. It thus is prevented in a simple way that the second disk carrier and the synchronizer ring positively are connected with each other, before a substantial speed synchronization has occurred.

The second disk carrier or a component firmly connected with the second disk carrier can form an axial stop for the friction ring, which in a starting position of the actuating body defines a ventilating position of the friction ring relative to the synchronizer ring.

In this case, a friction ring spring element preferably is provided, which axially urges the friction ring into the ventilating position, wherein in particular the friction ring spring element on the one hand supports on the second disk carrier and on the other hand on the friction ring.

Furthermore, there can be provided a bearing ring firmly connected with the second disk carrier, which is mounted on the actuating body firmly in axial direction and slidingly in circumferential direction. Moreover, the bearing ring can slidingly be mounted on the first disk carrier in axial direction and in circumferential direction.

According to a particularly preferred embodiment the second disk carrier, the form-fit ring, the bearing ring, the friction ring and the friction ring spring element form a pre-mounted assembly, so that the shifting device can be assembled with little assembly effort.

According to another embodiment of the shifting device the actuating body is axially shiftable between a starting position, in which the transmission shaft and the first disk carrier are decoupled in circumferential direction and the multidisk clutch is open, and a coupling position in which the transmission shaft and the first disk carrier are positively connected in circumferential direction and the multidisk clutch is closed.

In this embodiment an actuating body spring element can be provided, which axially urges the actuating body into the starting position, wherein in particular the actuating body spring element on the one hand supports on the first disk carrier and on the other hand on the actuating body.

Furthermore, it is preferred that the first disk carrier or a component firmly connected with the first disk carrier includes a cylinder portion and the actuating body is designed as piston, wherein the piston is axially shiftably guided in the cylinder portion.

The cylinder portion and the piston here can define a pressurizable chamber for the axial displacement of the piston.

DETAILED DESCRIPTION

Figure 1:
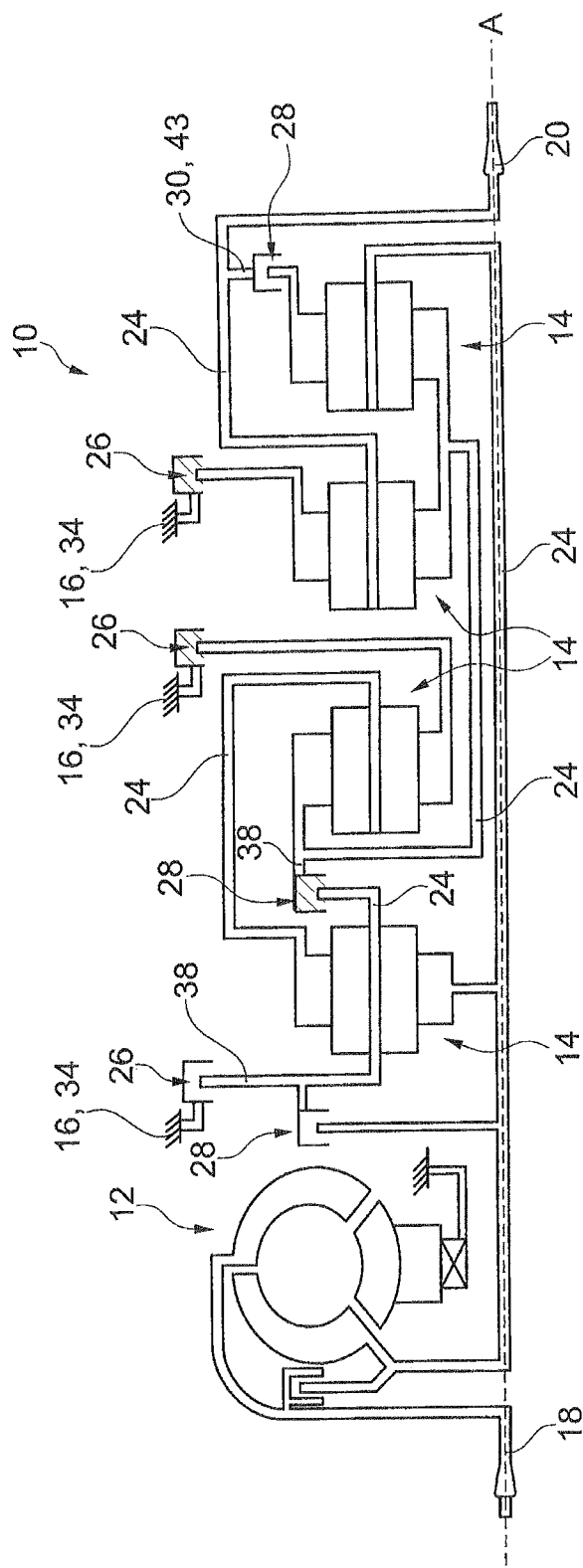
FIG. 1 shows a transmission diagram of a fully automatic stepped transmission with a shifting device according to the invention.

FIG. 1 shows an electrohydraulically actuated, fully automatic stepped transmission 10 of a motor vehicle with a torque converter 12, four planetary transmissions or planetary gearsets 14 and a schematically indicated transmission housing 16. Furthermore a drive shaft 18, a driven shaft 20 and several transmission shafts 24 are provided, wherein in the following planetary gear carriers also are referred to as transmission shafts 24. The transmission shafts 24 are associated to the individual planetary gearsets 14 and arranged coaxially to each other.

The stepped transmission 10 in addition includes shifting devices 26, 28, to which a hydraulic pressure can be applied and which can couple a transmission shaft 24 either with a further transmission shaft 24 or with the transmission housing 16 or can decouple the transmission shaft 24 from the further transmission shaft 24 or the transmission housing 16.

A shifting device 26, which couples the transmission shaft 24 with the transmission housing 16 also is referred to as braking device, and a shifting device 28, which couples two transmission shafts 24 with each other, also is referred to as coupling device. In the present exemplary embodiment six shifting devices 26, 28 are provided, of which three shifting devices 26 are formed as braking devices and three shifting devices 28 are formed as coupling devices. According to FIG. 1, by way of example, two braking devices and one coupling device are in the coupled condition (indicated hatched) and one braking device and two coupling devices are in the decoupled condition.

By various shift combinations of the shifting devices 26, 28 the gear ratios between the drive shaft 18 and the driven shaft 20 corresponding to the individual gear stages of the stepped transmission 10 then are obtained.

Since the general construction and mode of operation of fully automatic stepped transmissions 10 already is known in general from the prior art, the same will not be discussed further and in the following merely the constructive design and the function of the shifting devices 26, 28 according to the invention will be described in detail.

Figure 4:
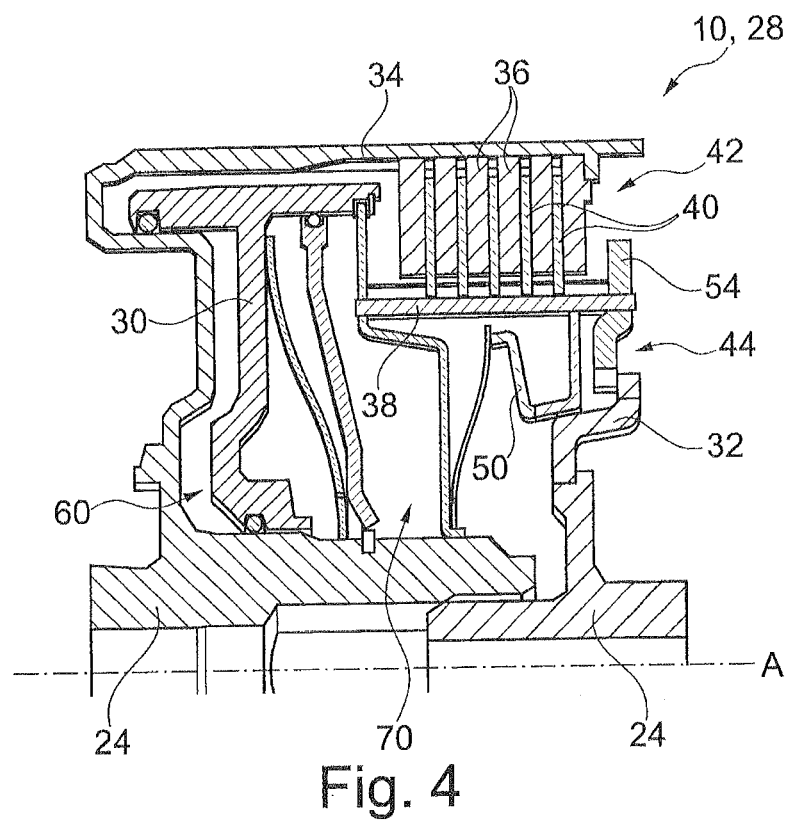
FIG. 4 shows a schematic section through the shifting device according to the invention in an axial frictional contact position of the actuating body.
Figure 5:
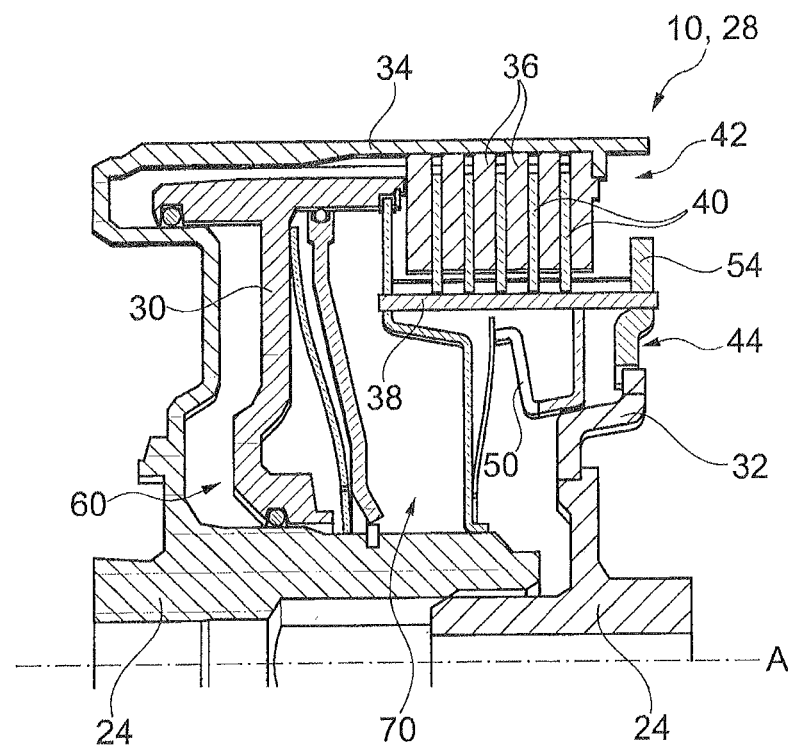
FIG. 5 shows a schematic section through the shifting device according to the invention in an axial form-fit position of the actuating body.
Figure 6:
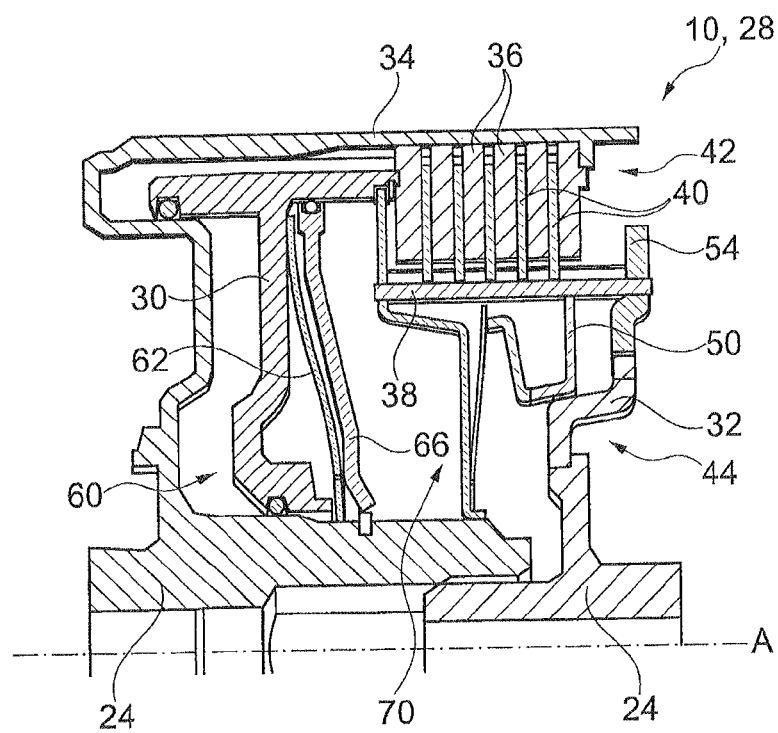
FIG. 6 shows a schematic section through the shifting device according to the invention in an axial coupling position of the actuating body.

FIGS. 2 to 6 each show a shifting device 28 for a motor vehicle transmission, in particular a fully automatic stepped transmission 10, wherein the shifting device 28, in particular an actuating body 30 of the shifting device 28, can take different axial positions and concretely is shown in an axial starting position (FIG. 2), an axial synchronizing position (FIG. 3), an axial frictional contact position (FIG. 4), an axial form-fit position (FIG. 5), and an axial coupling position (FIG. 6).

The shifting device 28 here comprises two transmission shafts 24 which each are rotatable about a transmission axis A, a synchronizer ring 32 which is firmly connected with one of the transmission shafts 24, a first disk carrier 34, a plurality of first disks 36 which are non-rotatably and axially shiftably connected with the first disk carrier 34, a second disk carrier 38 which is axially shiftable relative to the first disk carrier 34 and in circumferential direction can be coupled with the synchronizer ring 32 both frictionally and positively, a plurality of second disks 40 which are non-rotatably and axially shiftably connected with the second disk carrier 38 and form a multidisk clutch 42 with the first disks 36, and the actuating body 30 for axially pressurizing the second disk carrier 38. The actuating body 30 and the second disk carrier 38 are rotatable relative to each other in circumferential direction and are firmly connected with each other in axial direction.

In the illustrated exemplary embodiment the first disks 36 are external disks, which are non-rotatably and axially shiftably connected with the first disk carrier 34 designed as external disk carrier. Correspondingly, the second disks 40 are internal disks, which are non-rotatably and axially shiftably connected with the second disk carrier 38 designed as internal disk carrier.

According to FIGS. 2 to 6, the first disk carrier 34 substantially is non-rotatably connected with a further transmission shaft 24, in particular even formed integrally with the same. This further transmission shaft 24 non-rotatably connected with the first disk carrier 34 and the transmission shaft 24 firmly connected with the synchronizer ring 32 explicitly are two different, separate transmission shafts 24 of different planetary gearsets 14, which in particular are arranged coaxially. Correspondingly, the shifting device 28 acts as coupling device which is able to couple the transmission shaft 24 of a planetary gearset 14 with the transmission shaft 24 of another planetary gearset 14 via a multidisk clutch 42 and a synchronizer 44 in direction of rotation. First of all, a speed adaptation takes place, before the transmission shafts 24 are substantially non-rotatably connected via a frictional connection of the multidisk clutch 42 and a form-fit connection of the synchronizer 44.

Instead of the non-rotatable connection with a further transmission shaft 24, the first disk carrier 34 alternatively also can form a transmission housing 16 or be firmly connected with a transmission housing 16. Such shifting device 26 then correspondingly acts as braking device and can arrest the transmission shaft 24 firmly connected with the synchronizer ring 32 at the transmission housing 16.

With reference to FIGS. 2 to 6 it becomes clear that the actuating body 30 and the first disk carrier 34 substantially are non-rotatably and axially shiftably connected. The actuating body 30 is axially shiftable between a starting position according to FIG. 2, in which the transmission shaft 24 and the first disk carrier 34 are decoupled in circumferential direction and the multidisk clutch 42 is open, and a coupling position according to FIG. 6, in which the transmission shaft 24 and the first disk carrier 34 are positively connected in circumferential direction and the multidisk clutch 42 is closed.

Between the second disk carrier 38 and the transmission shaft 24 a synchronizer 44 is provided, in order to reduce the relatively high drag torques in the multidisk clutch 42, which occur when the multidisk clutch 42 is open.

Figure 2:
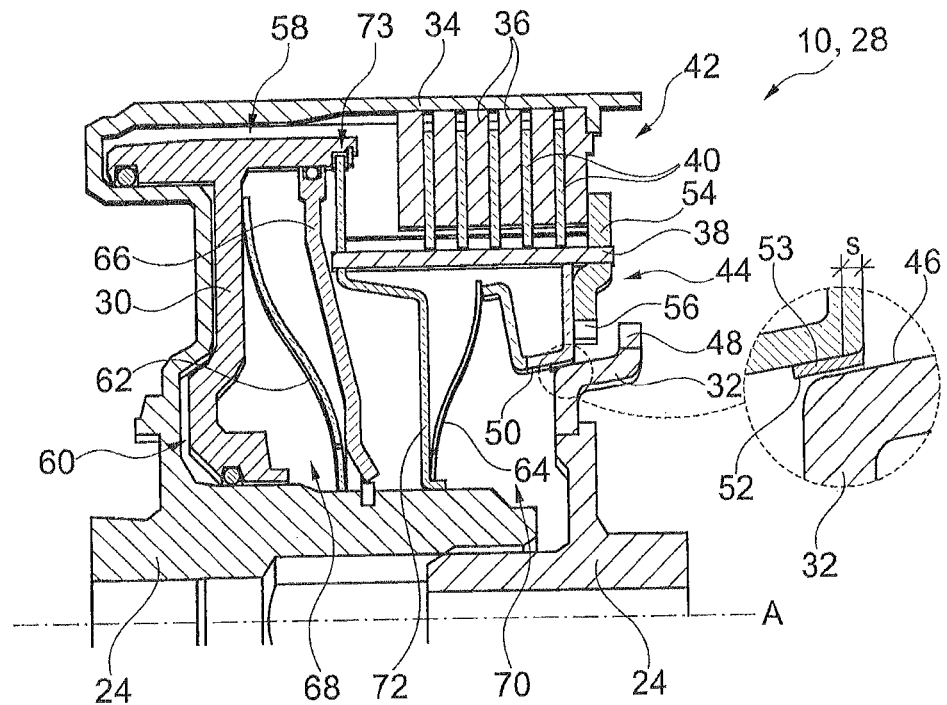
FIG. 2 a schematic section through the shifting device according to the invention in an axial starting position of an actuating body.
Figures 7, 8:
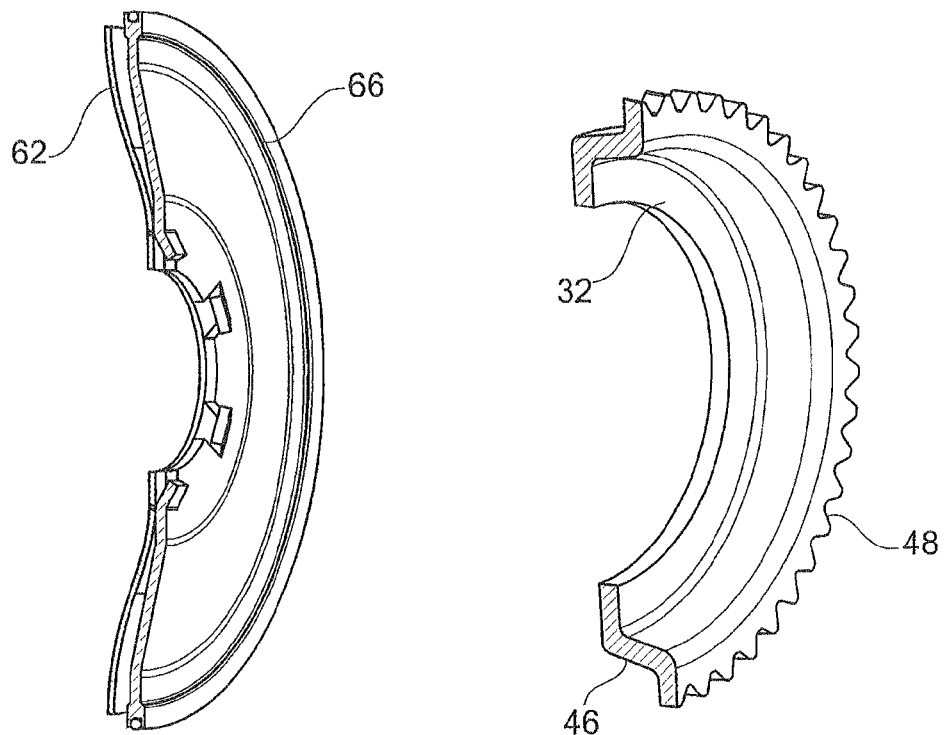
FIG. 7 shows a perspective sectional view of a partition wall and an actuating body spring element of the shifting device according to the invention.
FIG. 8 shows a perspective sectional view of a synchronizer ring of the shifting device according to the invention.
Figure 9:
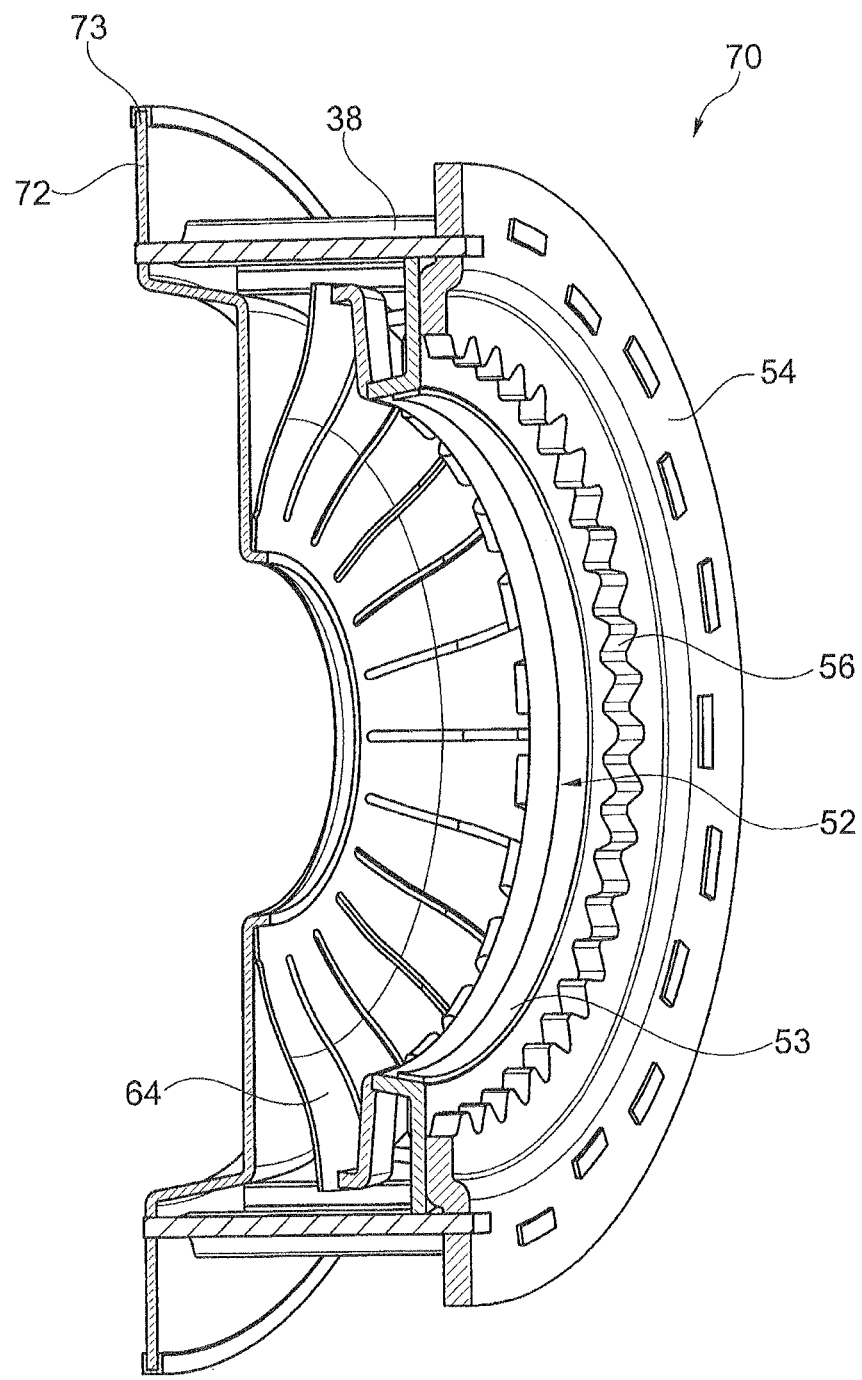
FIG. 9 shows a perspective sectional view of a pre-mounted assembly of the shifting device according to the invention.
Figure 10:
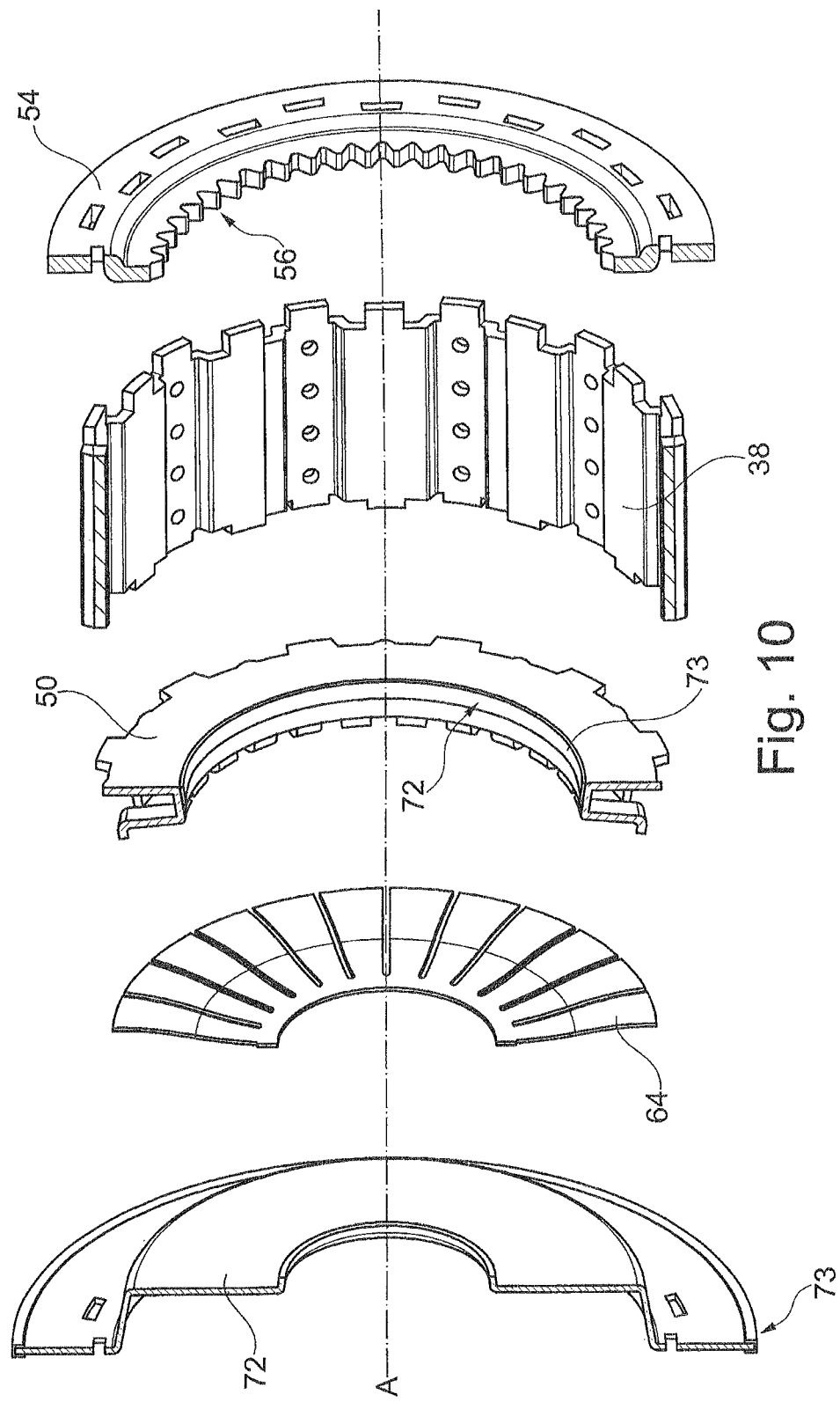
FIG. 10 shows a partly sectional, perspective exploded view of the pre-mounted assembly according to FIG. 9.

The synchronizer 44 of the shifting device 28 comprises the synchronizer ring 32 firmly connected with the transmission shaft 24, which is shown in detail in FIG. 8 and includes both a cone surface 46 and form-fit elements 48, as well as a separate friction ring 50 which is shiftable in axial direction and in circumferential direction is positively connected with the second disk carrier 38 and includes a cone surface 52 for the frictional coupling with the synchronizer ring 32 (see also FIGS. 9 and 10). The cone surfaces 46, 52 of the synchronizer ring 32 and the friction ring 50 are coaxial, parallel friction surfaces with identical cone angle, which can be brought in contact by axial relative displacement, in order to synchronize the friction ring 50 and the synchronizer ring 32 or substantially non-rotatably couple the same by frictional contact. Of course, at least one of the cone surfaces 46, 52 can be formed by a separate friction lining 53, as this is illustrated in FIGS. 2, 9 and 10 for the cone surface 52 of the friction ring 50.

The synchronizer 44 furthermore comprises a separate form-fit ring 54 which is firmly connected with the second disk carrier 38 and includes form-fit elements 56 for the positive coupling with the synchronizer ring 32. The form-fit elements 56 of the form-fit ring 54 can be brought in engagement with the form-fit elements 48 of the synchronizer ring 32 by axial relative displacement, in order to substantially non-rotatably couple the synchronizer ring 32 and the form-fit ring 54 in circumferential direction by positive connection.

According to FIGS. 8 and 9, the form-fit elements 48, 56 each are designed as toothings, wherein in the present case the form-fit elements 48 of the synchronizer ring 32 form an external toothing and the form-fit elements 56 of the form-fit ring 54 form an internal toothing. Each toothing comprises a plurality of teeth distributed in circumferential direction, wherein each tooth of a toothing in particular can include two opposite tooth flanks inclined with respect to the axial direction, which axially converge towards the other toothing in a wedge-shaped manner. In this way, "axial meshing" of the toothings is simplified. The two toothings axially adjoin each other in the shift positions according to FIGS. 2 to 4 and engage in each other in a form-fit position of the shifting device 28 according to FIGS. 5 and 6, so that the transmission shaft 24 is positively connected with the second disk carrier 38 in circumferential direction.

In the illustrated exemplary embodiment, the shifting device 28 is part of an electrohydraulically actuated, fully automatic stepped transmission 10, so that the chamber 60 can be pressurized by the pressure of a hydraulic fluid, in order to influence the rotation of the transmission shaft 24.

Instead of a hydraulic actuation an electromotive actuation of the shifting device 28 is of course also conceivable in the alternative.

According to FIGS. 2 to 6, the first disk carrier 34 or a component firmly connected with the first disk carrier 34 includes a cylinder portion 58. Furthermore, the actuating body 30 is designed as piston which is axially shiftably guided in the cylinder portion 58. The cylinder portion 58 and the actuating body 30 designed as piston define a pressurizable chamber 60 for the axial displacement of the piston.

Against the pressure of the hydraulic fluid, the actuating body 30 is axially urged into its starting position according to FIG. 2 by an actuating body spring element 62, wherein the actuating body spring element 62 on the one hand supports on the actuating body 30 and on the other hand on the first disk carrier 34. The first disk carrier 34 in the present exemplary embodiment also forms an axial stop for the actuating body 30, which defines the axial starting position of the shifting device 28.

In this starting position of the shifting device 28 the synchronizer ring 32 and the friction ring 50 are in a so-called ventilating position, in which the cone surfaces 46, 52 are spaced from each other. An axial clearance s, i.e. an axial displacement of the friction ring 50 proceeding from the starting position of the shifting device 28 up to the contact of the cone surfaces 46, 52 is in the order of magnitude of few millimeters, preferably about 1 mm.

The form-fit ring 54 firmly connected with the second disk carrier 38 forms an axial stop for the friction ring 50, which in a starting position of the actuating body 30 defines the ventilating position of the friction ring 50 relative to the synchronizer ring 32. For axially urging the friction ring 50 into the ventilating position a friction-ring spring element 64 is provided, which on the one hand supports on the second disk carrier 38 and on the other hand on the friction ring 50.

In this ventilating position of the synchronizer 44, a drag torque likewise is obtained at a speed difference of the transmission shafts 24, which due to the distinctly smaller friction surface however is considerably smaller than in the case of the open multidisk clutch 42. Correspondingly, a relative rotation in the starting position of the shifting device 28 exclusively or at least for the most part takes place within the synchronizer 44 between the synchronizer ring 32 and the friction ring 50. Due to the drag torques in the (open) multidisk clutch 42, the second disk carrier 38 moves synchronously or at least largely synchronously with the first disk carrier 34, so that in the starting position of the shifting device 28 merely the small drag torque of the synchronizer 44 occurs, which has a positive effect on the transmission efficiency.

Figure 3:
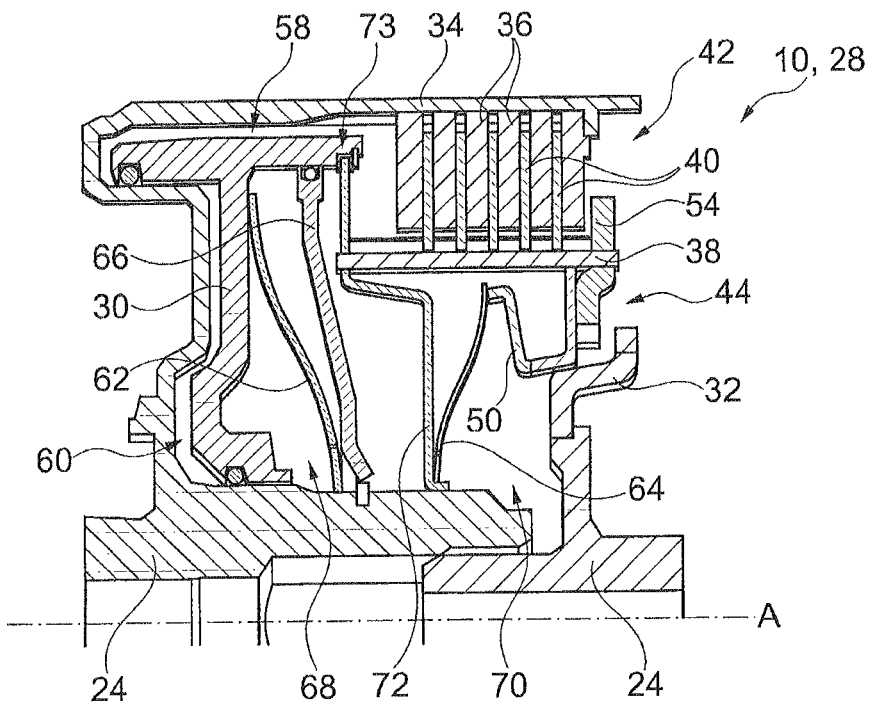
FIG. 3 shows a schematic section through the shifting device according to the invention in an axial frictional position of the actuating body.

FIG. 3 shows the shifting device 28 in the condition of a beginning frictional connection between the synchronizer ring 32 non-rotatably connected with the transmission shaft 24 and the friction ring 50.

As a result of a pressurization of the chamber 60, the actuating body 30 designed as piston has axially released from the starting position according to FIG. 2 to such an extent that the cone surface 52 of the friction ring 50 already forms a first frictional contact with the cone surface 46 of the synchronizer ring 32. Consequently, the actuating body 30 according to FIG. 3 is in an axial frictional or synchronizing position.

According to FIG. 4, the actuating body 30 axially has moved even further away from its starting position as compared to FIG. 3 due to an increase of the hydraulic pressure in the chamber 60 and now is in a frictional contact position. Due to this further axial movement of the actuating body 30, the transmission shaft 24 now is synchronized with the second disks 40 via the synchronizer ring 32 and the second disk carrier 38, so that now the relative rotation within the shifting device 28 takes place in the multidisk clutch 42, i.e. between the first and second disks 36, 40, analogous to conventional stepped transmissions 10.

In this frictional contact position of the shifting device 28 the form-fit ring 54 is located axially directly before a form-fit engagement with the synchronizer ring 32.

Due to a further increase of the hydraulic pressure in the chamber 60, the actuating body 30 according to FIG. 5 has moved even further away from its axial starting position and now is in the axial form-fit position in which the synchronizer ring 32 and the second disk carrier 38 not only are frictionally connected via the friction ring 50, but also are positively connected via the form-fit ring 54. This leads to the fact that the torque transmission capacity of the synchronizer 44 is increased drastically.

The multidisk clutch 42 is open up to this form-fit position of the actuating body 30, so that between the first disks 36 and the second disks 40 a relative rotation is possible.

FIG. 6 finally shows the shifting device 28 in the axial coupling position of the actuating body 30. Analogous to the form-fit position according to FIG. 5, the transmission shaft 24 and the first disk carrier 34 remain positively connected in circumferential direction. As a result of the further displacement away from its starting position, the actuating body 30 now however also urges the disks 36, 40 in axial direction, so that the multidisk clutch 42 is closed according to FIG. 6 and the transmission shafts 24 have synchronous speeds.

FIG. 7 shows a ring-shaped partition wall 66 firmly connected with the second disk carrier 38, which in axial direction is firmly mounted and in circumferential direction is slidingly mounted on the actuating body 30. The partition wall 66 in addition is slidingly mounted on the first disk carrier 34 in axial direction and in circumferential direction. In addition, FIG. 7 shows the actuating body spring element 62 which on the one hand supports on the first disk carrier 34 via the partition wall 66 and on the other hand supports on the actuating body 30 and axially urges the actuating body 30 into the starting position according to FIG. 2.

At high speed of the further transmission shaft 24 centrifugal forces are obtained in the chamber 60 due to the rotation of the hydraulic fluid, which axially pressurize the actuating body 30 against the force of the actuating body spring element 62 and can lead to an undesired frictional contact between the friction ring 50 and the synchronizer ring 32. For compensating the centrifugal forces the partition wall 66 therefore is provided, which in the cylinder portion 58 of the first disk carrier 34 defines a further chamber 68 in which the actuating body spring element 62 is accommodated. With stationary further transmission shaft 24 this further chamber 68 is filled with largely pressureless hydraulic fluid, so that during a rotation of the further transmission shaft 24 only centrifugal forces are acting. The axial forces resulting from the centrifugal forces of the hydraulic fluid in the chambers 60, 68, substantially cancel each other out, so that no undesired speed-dependent axial force resulting from the centrifugal forces of the hydraulic fluid acts on the actuating body 30.

FIG. 8 shows a perspective sectional view of the synchronizer ring 32 which can be manufactured as shaped sheet-metal part, wherein the sheet metal thickness preferably lies in the order of magnitude of about 3 mm. The synchronizer ring 32 includes both the cone surface 46 and the form-fit elements 48 and is firmly connected with the transmission shaft 24, in particular press-fitted and/or welded.

FIG. 9 shows a pre-mounted assembly 70 for the shifting device 28, wherein this assembly 70 comprises the second disk carrier 38, the form-fit ring 54, the friction ring 50, the friction ring spring element 64 and a bearing ring 72.

FIG. 10 shows the prefabricated assembly 70 according to FIG. 9 in a perspective exploded view.

The ring-shaped, second disk carrier 38 is manufactured from a shaped and subsequently rolled and welded sheet metal, wherein the sheet metal thickness preferably lies in the order of magnitude of about 2 mm. The form-fit ring 54 adjoining an axial end of the second disk carrier 38 likewise is designed as shaped sheet-metal part, wherein the sheet metal thickness of the form-fit ring 54 preferably lies in the order of magnitude of about 3 mm. The second disk carrier 38 and the form-fit ring 54 are firmly connected with each other, in particular stamped and/or riveted.

In the illustrated exemplary embodiment, the friction ring 50 axially shiftably accommodated in the interior of the second disk carrier 38 also is a shaped sheet-metal part whose sheet metal thickness preferably lies in the order of magnitude of about 1.5 mm. The cone surface 52 of the friction ring 50 here is formed by the separate friction lining 53.

Axially adjacent to the friction ring 50 the friction ring spring element 64 is accommodated in the interior of the second disk carrier 38, which is designed as disk spring with flat and preferably falling spring curve. In the clamped condition according to FIG. 9, the axial force of the friction ring spring element 64 preferably is about 1 kN, particularly preferably below 1 kN.

The friction ring spring element 64 axially supports on the friction ring 50 and on the bearing ring 72. In the present exemplary embodiment the bearing ring 72 is designed as shaped sheet-metal part whose sheet metal thickness preferably lies in the order of magnitude of about 1 mm.

On its radial outer circumference the bearing ring 72 includes a plain bearing 73 which in the synchronizing position according to FIG. 3, in the frictional contact position according to FIG. 4 and in the form-fit position according to FIG. 5 slides on the actuating body 30 in circumferential direction. In the starting position according to FIG. 2 and in the coupling position according to FIG. 6 the actuating body 30 and the bearing ring 72 on the other hand have substantially identical speeds, so that there is no or hardly any relative rotation between the bearing ring 72 and the actuating body 30. In axial direction, the bearing ring 72 is firmly connected with the actuating body 30, wherein in the exemplary embodiment according to FIGS. 2 to 6 a circlip is provided for the axial fixation of the bearing ring 72, which engages into a groove of the actuating body 30.

The bearing ring 72 is arranged axially opposite the form-fit ring 54 at an axial end of the second disk carrier 38 and analogous to the form-fit ring 54 is firmly connected with the second disk carrier 38, in particular stamped and/or riveted.

Via the axially substantially clearance-free connections of the bearing ring 72 both with the actuating body 30 and with the disk carrier 38, the actuating body 30 and the disk carrier 38 also are firmly connected with each other axially. Under the usual loads occurring in operation of a vehicle, the material deformations of the components, in particular of the bearing ring 72, are negligible.

The components shown in FIG. 10 are assembled in axial direction and form the pre-mounted assembly 70 according to FIG. 9, wherein the friction ring 50 is axially pretensioned against the form-fit ring 54 by the friction ring spring element 64.

Figure 11:
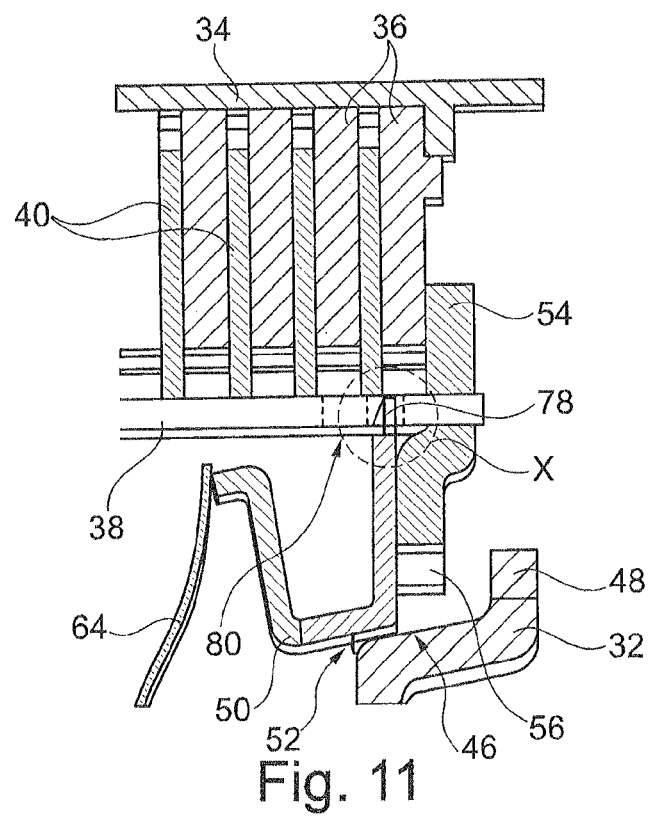
FIG. 11 shows a detail of the shifting device of the invention according to a particular design variant.

FIG. 11 shows a section of the shifting device 28 in the region of the friction ring 50 according to a special design variant.

Figure 12:
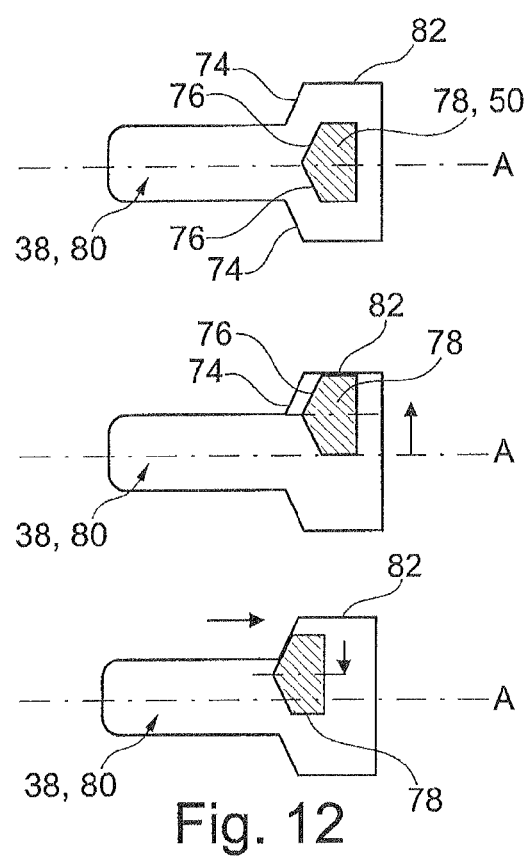
FIG. 12 shows three schematic diagrams which for the design variant according to FIG. 11 illustrate a blockage of the axial relative displacement between the second disk carrier and the friction ring.

In this design variant, the friction ring 50 and the second disk carrier 38 are rotatable relative to each other in circumferential direction to a limited extent and according to FIG. 12 include blocking surfaces 74, 76 associated to each other, which enable or block an axial relative displacement between the friction ring 50 and the second disk carrier 38 depending on a synchronizing torque between the friction ring 50 and the synchronizer ring 32.

FIG. 12 shows schematic representations of a connecting region X according to FIG. 11, wherein the friction ring 50 has different positions relative to the second disk carrier 38.

A radial protrusion 78 of the friction ring 50 engages into a groove 80 of the second disk carrier 38, which extends in axial direction and in the axial starting position of the shifting device 28 includes a groove portion flared in circumferential direction in the region of the radial protrusion 78 (see FIG. 12, upper representation).

At a speed difference between the second disk carrier 38 and the friction ring 50 the radial protrusion 78 in the region of the flared groove portion is shifted in circumferential direction up to a groove stop 82 (see FIG. 12, middle representation).

When the actuating body 30 (and the second disk carrier 38 firmly connected with the actuating body 30) now is to be shifted axially into the form-fit position according to FIG. 5, this axial movement can be prevented by the blocking surfaces 74, 76 (see FIG. 12, lower representation). An inclination of the blocking surfaces 74, 76 is chosen such that the blocking surfaces 74, 76 associated to each other block such axial relative movement in the case of too large a synchronizing torque (speed difference) between the friction ring 50 and the synchronizer ring 32, and upon falling below a specified synchronizing torque slide along each other in circumferential direction and ultimately enable an axial relative displacement.

In this way it is prevented with little effort that the shifting device 28 takes its form-fit position according to FIG. 5 despite a considerable speed difference between the friction ring 50 and the synchronizer ring 32. On the one hand, this would lead to an undesirably large wear of the form-fit elements 48, 56 and on the other hand to disturbing shift noises.

In other words, the synchronizer 44 provided between the transmission shaft 24 and the second disk carrier 38 here is designed as locking synchronizer.

The invention claimed is:

1. A shifting device for a motor vehicle transmission, comprising
several transmission shafts which each are rotatable about a transmission axis,
a synchronizer ring which is firmly connected with a transmission shaft,
a first disk carrier,
a plurality of first disks which are non-rotatably and axially shiftably connected with the first disk carrier,
a second disk carrier which is axially shiftable relative to the first disk carrier and can be coupled with the synchronizer ring both frictionally and positively in a circumferential direction,
a plurality of second disks which are non-rotatably and axially shiftably connected with the second disk carrier and form a multidisk clutch with the first disks,
an actuating body for axially pressurizing the second disk carrier, wherein the actuating body and the second disk carrier are rotatable relative to each other in the circumferential direction and are substantially firmly connected with each other in an axial direction, and further comprising a friction ring which is axially shiftably and in the circumferential direction positively connected with the second disk carrier and includes a cone surface for frictional coupling with the synchronizer ring, wherein the friction ring and the second disk carrier are rotatable relative to each other in the circumferential direction to a limited extent and include blocking surfaces associated to each other, which enable or block an axial relative displacement between the friction ring and the second disk carrier depending on a synchronizing torque between the friction ring and the synchronizer ring.

2. The shifting device according to claim 1, wherein the first disk carrier forms a transmission housing or is firmly connected with a transmission housing.

3. The shifting device according to claim 1, wherein the first disk carrier is substantially non-rotatably connected with a further transmission shaft.

4. The shifting device according to claim 1, characterized by a form-fit ring which is firmly connected with the second disk carrier and includes form-fit elements for the positive coupling with the synchronizer ring.

5. The shifting device according to claim 4, wherein the synchronizer ring includes form-fit elements which can be brought in engagement with the form-fit elements of the form-fit ring by axial relative displacement, in order to couple the synchronizer ring and the form-fit ring in the circumferential direction.

6. The shifting device according to claim 1, wherein the synchronizer ring includes a cone surface which can be brought in contact with the cone surface of the friction ring by axial relative displacement, in order to couple the synchronizer ring and the friction ring in the circumferential direction.

7. The shifting device according to claim 1, wherein the second disk carrier or a component firmly connected with the second disk carrier forms an axial stop for the friction ring, which in a starting position of the actuating body defines a ventilating position of the friction ring.

8. The shifting device according to claim 7, wherein a friction ring spring element is provided, which axially urges the friction ring into its ventilating position.

9. The shifting device according to claim 8, wherein the friction ring spring element on the one hand supports on the second disk carrier and on the other hand on the friction ring.

10. The shifting device according to claim 1, further comprising a bearing ring firmly connected with the second disk carrier, which is mounted on the actuating body firmly in the axial direction and slidingly in the circumferential direction.

11. The shifting device according to claim 1, wherein the actuating body is axially shiftable between a starting position, in which the transmission shaft and the first disk carrier are decoupled in the circumferential direction and the multidisk clutch is open, and a coupling position in which the transmission shaft and the first disk carrier are positively connected in the circumferential direction and the multidisk clutch is closed.

12. The shifting device according to claim 11, wherein an actuating body spring element is provided, which axially urges the actuating body into the starting position.

13. The shifting device according to claim 12, wherein the actuating body spring element on the one hand supports on the first disk carrier and on the other hand on the actuating body.

14. The shifting device according to claim 1, wherein the first disk carrier or a component firmly connected with the first disk carrier includes a cylinder portion and the actuating body is designed as a piston, wherein the piston is axially shiftably guided in the cylinder portion.

15. The shifting device according to claim 14, wherein the cylinder portion and the piston define a pressurizable chamber for the axial displacement of the piston.

* * * * *